(12) United States Patent
Knutsson et al.

(10) Patent No.: US 9,409,089 B2
(45) Date of Patent: Aug. 9, 2016

(54) METHOD FOR IMPLEMENTING A COMPUTER GAME

(71) Applicant: King.com Limited, St. Julians (MT)

(72) Inventors: Sebastian Knutsson, Stockholm (SE); Tobias Nyblom, Stockholm (SE); Iona Rosin, Stockholm (SE)

(73) Assignee: KING.COM LTD., St. Julians (MT)

( * ) Notice: Subject to any disclaimer, the term of this patent is extended or adjusted under 35 U.S.C. 154(b) by 204 days.

(21) Appl. No.: 14/029,480

(22) Filed: Sep. 17, 2013

(65) Prior Publication Data

US 2014/0135120 A1    May 15, 2014

Related U.S. Application Data

(60) Provisional application No. 61/701,907, filed on Sep. 17, 2012, provisional application No. 61/811,019, (Continued)

(30) Foreign Application Priority Data

| | | |
|---|---|---|
| Feb. 6, 2013 | (GB) | 1302121.7 |
| Feb. 19, 2013 | (GB) | 1302910.3 |
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
*G06F 17/00* (2006.01)
*A63F 13/25* (2014.01)
(Continued)

(52) U.S. Cl.
CPC ............... *A63F 13/25* (2014.09); *A63B 71/06* (2013.01); *A63F 13/00* (2013.01); *A63F 13/005* (2013.01);
(Continued)

(58) Field of Classification Search
USPC .......................................... 463/16–25, 30–32
See application file for complete search history.

(56) References Cited

U.S. PATENT DOCUMENTS

| | | |
|---|---|---|
| 5,488,496 A | 1/1996 | Pine |
| 6,068,552 A | 5/2000 | Walker et al. |

(Continued)

FOREIGN PATENT DOCUMENTS

| | | |
|---|---|---|
| DE | 10304725 A1 | 9/2004 |
| EP | 1564698 A2 | 8/2005 |

(Continued)

OTHER PUBLICATIONS

"Amazon Survival YouTube video, Uploaded to YouTube on Mar. 13, 2009, video length 6:06", https://www.youtube.com/watch?v=8S2gM5POUUk, Mar. 13, 2009, 1.

(Continued)

*Primary Examiner* — Ronald Laneau
(74) *Attorney, Agent, or Firm* — Saul Ewing LLP

(57) ABSTRACT

A method, implemented as computer code being executed by one or more processors, in which a computing device displays computer game graphics showing a score for a computer game, and in which, one or more of the processors are programmed to: (a) receive the score a player achieves while playing a game; and (b) visually indicate how this score relates to one or multiple pre-defined goals; (c) receive information about the high scores of different players of the game (d) compare the current score of the player, the previous high score of the player and the high scores of the different players; and (e) during the play of the game, visually represent the difference between the current score, the high scores of the different players and the pre-defined goal(s).

27 Claims, 10 Drawing Sheets

Related U.S. Application Data filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(51) Int. Cl.
  *G07F 17/32* (2006.01)
  *A63F 13/00* (2014.01)
  *A63B 71/06* (2006.01)
  *A63F 13/30* (2014.01)
  *A63F 13/40* (2014.01)
  *G06F 9/44* (2006.01)

(52) U.S. Cl.
  CPC ................ *A63F 13/10* (2013.01); *A63F 13/12* (2013.01); *A63F 13/30* (2014.09); *G06F 9/44* (2013.01); *G07F 17/32* (2013.01); *G07F 17/3274* (2013.01)

(56) References Cited

U.S. PATENT DOCUMENTS

| | | | |
|---|---|---|---|
| 6,117,013 A | 9/2000 | Eiba | |
| 7,073,792 B2 | 7/2006 | Esposito et al. | |
| 7,749,060 B1 | 7/2010 | Olmes et al. | |
| 8,002,633 B2* | 8/2011 | Shimizu | 463/31 |
| 8,075,404 B2 | 12/2011 | Stamper et al. | |
| 8,088,010 B1 | 1/2012 | Hill et al. | |
| 8,237,743 B2 | 8/2012 | Csurka et al. | |
| 8,277,320 B1 | 10/2012 | Hart et al. | |
| 8,369,873 B2 | 2/2013 | Krasner et al. | |
| 8,388,446 B1 | 3/2013 | Craine et al. | |
| 8,526,490 B2 | 9/2013 | Buckley et al. | |
| 8,672,744 B1 | 3/2014 | Steere et al. | |
| 8,711,923 B2 | 4/2014 | Buckley et al. | |
| 8,727,893 B2 | 5/2014 | Otremba et al. | |
| 8,784,181 B2 | 7/2014 | Frank et al. | |
| 8,964,830 B2 | 2/2015 | Perlman et al. | |
| 9,033,803 B1 | 5/2015 | Etter et al. | |
| 2002/0068632 A1 | 6/2002 | Dunlap et al. | |
| 2002/0082068 A1 | 6/2002 | Singhal et al. | |
| 2002/0094870 A1 | 7/2002 | Murray et al. | |
| 2003/0049592 A1 | 3/2003 | Park et al. | |
| 2003/0074416 A1 | 4/2003 | Bates et al. | |
| 2003/0119581 A1 | 6/2003 | Cannon et al. | |
| 2004/0053688 A1 | 3/2004 | Hosaka et al. | |
| 2004/0137987 A1 | 7/2004 | Nguyen et al. | |
| 2004/0224772 A1 | 11/2004 | Canessa et al. | |
| 2005/0256985 A1 | 11/2005 | Shea et al. | |
| 2006/0068876 A1 | 3/2006 | Kane et al. | |
| 2006/0160620 A1 | 7/2006 | Matthews et al. | |
| 2006/0223635 A1 | 10/2006 | Rosenberg et al. | |
| 2006/0277474 A1 | 12/2006 | Robarts et al. | |
| 2006/0281541 A1 | 12/2006 | Nguyen et al. | |
| 2006/0287098 A1 | 12/2006 | Morrow et al. | |
| 2007/0077993 A1 | 4/2007 | Midgley et al. | |
| 2007/0259709 A1 | 11/2007 | Kelly et al. | |
| 2008/0005353 A1 | 1/2008 | Panabaker et al. | |
| 2009/0170608 A1 | 7/2009 | Herrmann et al. | |
| 2009/0203415 A1 | 8/2009 | Falciglia et al. | |
| 2009/0209311 A1 | 8/2009 | Bennett et al. | |
| 2010/0144426 A1 | 6/2010 | Winner et al. | |
| 2010/0151934 A1 | 6/2010 | Kniberg et al. | |
| 2010/0218135 A1 | 8/2010 | Brugler et al. | |
| 2010/0227675 A1 | 9/2010 | Luxton et al. | |
| 2010/0271367 A1 | 10/2010 | Vaden et al. | |
| 2010/0317437 A1 | 12/2010 | Berry et al. | |
| 2011/0014977 A1 | 1/2011 | Yamazaki et al. | |
| 2011/0053681 A1 | 3/2011 | Goldman et al. | |
| 2011/0111835 A1 | 5/2011 | Cohen et al. | |
| 2011/0136561 A1 | 6/2011 | Acres et al. | |
| 2011/0136572 A1 | 6/2011 | Karn et al. | |
| 2011/0269532 A1 | 11/2011 | Shuster et al. | |
| 2012/0030094 A1 | 2/2012 | Khalil et al. | |
| 2012/0040752 A1 | 2/2012 | Koo et al. | |
| 2012/0077580 A1 | 3/2012 | Mahajan et al. | |
| 2012/0079126 A1 | 3/2012 | Evans et al. | |
| 2012/0122552 A1 | 5/2012 | Youm et al. | |
| 2012/0191606 A1 | 7/2012 | Milne et al. | |
| 2012/0198417 A1 | 8/2012 | Haviv et al. | |
| 2013/0035164 A1 | 2/2013 | Osvald et al. | |
| 2013/0172061 A1 | 7/2013 | Iosilevsky et al. | |
| 2013/0267285 A1 | 10/2013 | Kelley et al. | |
| 2013/0316832 A1 | 11/2013 | Olofsson et al. | |
| 2013/0323697 A1 | 12/2013 | Shadduck et al. | |
| 2013/0331162 A1* | 12/2013 | Krivicich et al. | 463/10 |
| 2014/0024450 A1 | 1/2014 | Ramachandran et al. | |
| 2014/0080600 A1 | 3/2014 | Knutsson et al. | |
| 2014/0235338 A1* | 8/2014 | Hansson et al. | 463/31 |
| 2014/0252987 A1 | 9/2014 | Hinrichs et al. | |
| 2014/0342791 A1 | 11/2014 | Valeriano et al. | |
| 2014/0357367 A1 | 12/2014 | Lee | |
| 2014/0370950 A1* | 12/2014 | Hansson et al. | 463/9 |
| 2015/0050997 A1 | 2/2015 | Suzman et al. | |
| 2015/0174489 A1 | 6/2015 | Evald et al. | |

FOREIGN PATENT DOCUMENTS

| | | | |
|---|---|---|---|
| EP | 1870143 A1 | 12/2007 | |
| EP | 2211299 A2 | 7/2010 | |
| JP | 2005-228086 | 8/2005 | |
| WO | WO01/46790 A2 | 6/2001 | |
| WO | 2006/052212 A1 | 5/2006 | |
| WO | 2007/078533 A2 | 7/2007 | |
| WO | WO 2007/078533 | 7/2007 | |
| WO | WO 2008/109685 A2 | 9/2008 | |
| WO | 2009/029108 A1 | 3/2009 | |
| WO | 2010/002897 | 1/2010 | |
| WO | WO 2010/045716 A1 | 4/2010 | |
| WO | 2010/083346 A1 | 7/2010 | |
| WO | WO 2010/096784 A1 | 8/2010 | |
| WO | 2011/011466 | 1/2011 | |
| WO | WO 2011/041467 A2 | 4/2011 | |
| WO | WO 2012/013198 A1 | 2/2012 | |
| WO | WO 2013174933 | 11/2013 | |

OTHER PUBLICATIONS

"Bejeweled 2 Wikipedia ARticle", Sep. 30, 2015, 1-3.
"Bejeweled article", Wikipedia, Sep. 30, 2015.
"Best iOS/Android cross-platform mobiledevelopment SDKs", retrieved from the Internet: URL:http://webification.com/best-iosandroid-cross-platform-mobile-development-sdks [retrieved on Jul. 2, 2013], Sep. 26, 2011, p. 1.
"Buck Rodgers Turn Based Strategy Game Design and Planning Document", https://cs.nyu.edu/courses/spring07/V22.0474.001/groups/tbsgame/tbsgame_des.pdf, Feb. 21, 2007.
"Candy Crush Saga Facebook Game levels 1-10 video on YouTube, YouTube screen shorts figures 1-7", https://www.youtube.com/watch?v=8TIeNDnJiN8, Apr. 15, 2012.
"Candy Crush Saga for Facebook, YouTube video demonstrating levels 1-10, video length 15:23", https://www.youtube.com/watch?v=cfqHVkWX5yE, Apr. 12, 2012, 1 page.
"Candy Crush Saga on Facebook Review on YouTube video, Screen shots of YouTube video, figures 1-13", https://www.youtube.com/watch?v=AbH8Givg6XM, Sep. 7, 2012.
"Cross-platform", retrieved from the Internet: URL:http://en.widipedia.org/w/index.php?title=Cross-platform&oldid=487867404 [retrieved on Jul. 1, 2013], Apr. 17, 2012, pp. 1-16.
"Dig Dug article", Wikipedia, Sep. 30, 2015.
"Game Architecture: Model-View-Controller", retrieved from the Internet: URL:http://www.koonsolo.com/news/model-view-controller-for-games/ [retrieved on Oct. 8, 2013], Jul. 13, 2009, pp. 1-2.

(56) References Cited

OTHER PUBLICATIONS

"Minecraft", retrieved from the Internet: URL:http://en.widipedia.org/w/index?title=Minecraft&oldid=409326251 [retrieved on Jul. 1, 2013], May 2, 2014.

"Model-view-controller", retrieved from the Internet: URL:http://en.widipedia.org/w/index/php?title=Model%E2%80%93view%E2%80%93controller&oldid=511810952 retrieved on Oct. 8, 2013], Sep. 11, 2012, pp. 1-2.

"OpenOfice, Creating Charts and Graphs", Dec. 2004, 1-17.

"Pygame", retrieved from the Internet: URL:http://web.archive/org/web/20120413123244/http://www.pygame.org/wiki/tut_design [retrieved on Oct. 8, 2013, Apr. 13, 2012, pp. 1-5.

Anonymous, "Bubble Witch Saga—GameSpot", Retrieved from the Internet: URL:http://www.gamespot.co/bubble-witch-saga/ [retrieved on Mar. 21, 2014], pp. 1-2.

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014], Oct. 17, 2012, pp. 1-2.

Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014], pp. 1-2.

Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013], Apr. 12, 2012, pp. 1-10.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012], Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015], Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014], Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013], Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013, May 1, 2012, pp. 1-4.

Collins, "Will Collins Game Spotlight: Candy Crush Saga", retrieved from the Internet: URL:https//developers.facebook.com/blog/post/2012/06/15/game-spotlight--candy-crush-saga/ [retrieved on Oct. 25, 2013], Jun. 15, 2012, pp. 1-2.

Demeter, "Trism: Upcoming iPhone Game by Demiforce", retrieved from the Internet: URL: https://www.youtube.com/watch?v=hy0ptZisr70, [retrieved on Apr. 16, 2015], Feb. 26, 2008.

Dotson, "Bubble Witch Saga Pops Bubbles o iOS and Facebook > 148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013], Jul. 27, 2012, pp. 1-2.

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013], Aug. 16, 2011, p. 1.

Josef, "Bloxley Tutorial #1—Sokoban", http://bloxley.net/2010/10/tutorial-1-sokoban, Oct. 13, 2010.

Murphy, "Bejeweled 2 Strategy Guide", www.bigfishgames.com, Aug. 15, 2010.

Namco, "Dig Dug Video Game", 1982.

Popcap, "Bejeweled Video Game", 2001.

Rua, "Candy Crush Saga Gameplay First Look (Episode 1-10 levels)", retrieved from the Internet: URL: https://www.youtube.com/watch?v=8TIeNDnJiN8 [retrieved on Apr. 16, 2015], Apr. 15, 2012.

Schoenau-Fog, "The Player Engagement Process—An Exploration of Continuation Desire in Digital Games", http://www.digra.org/wp--content/uploads/digital-library/11307.06025.pdf, 2011.

Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013], Jun. 27, 2012, pp. 1-2.

\* cited by examiner

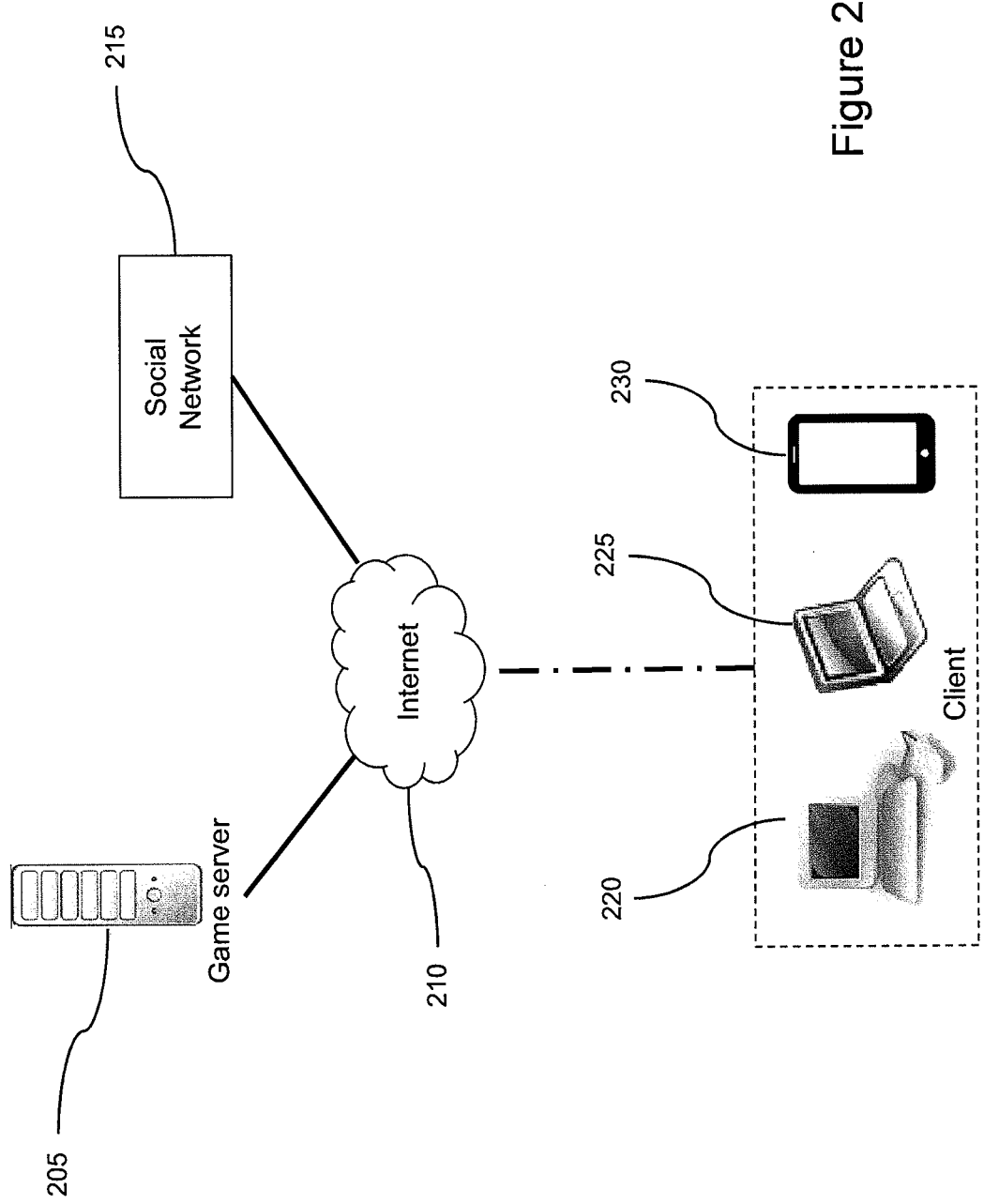

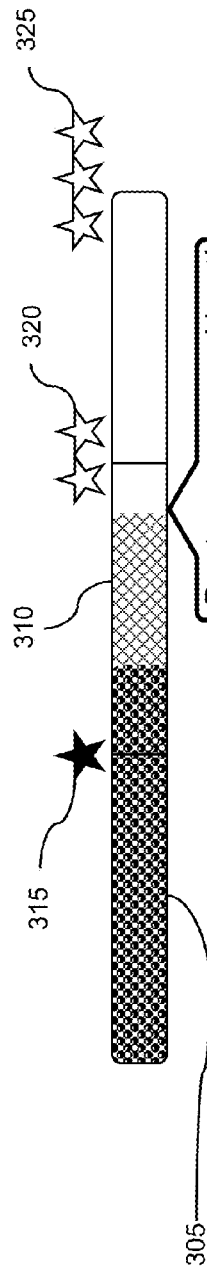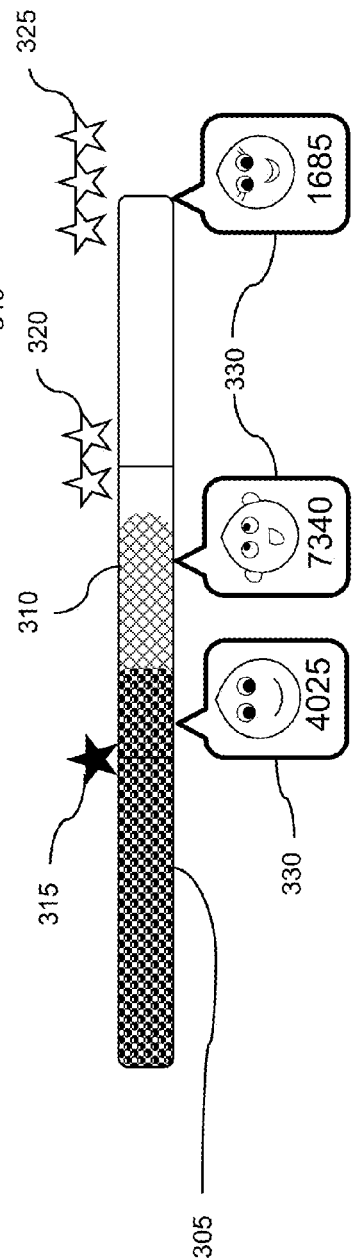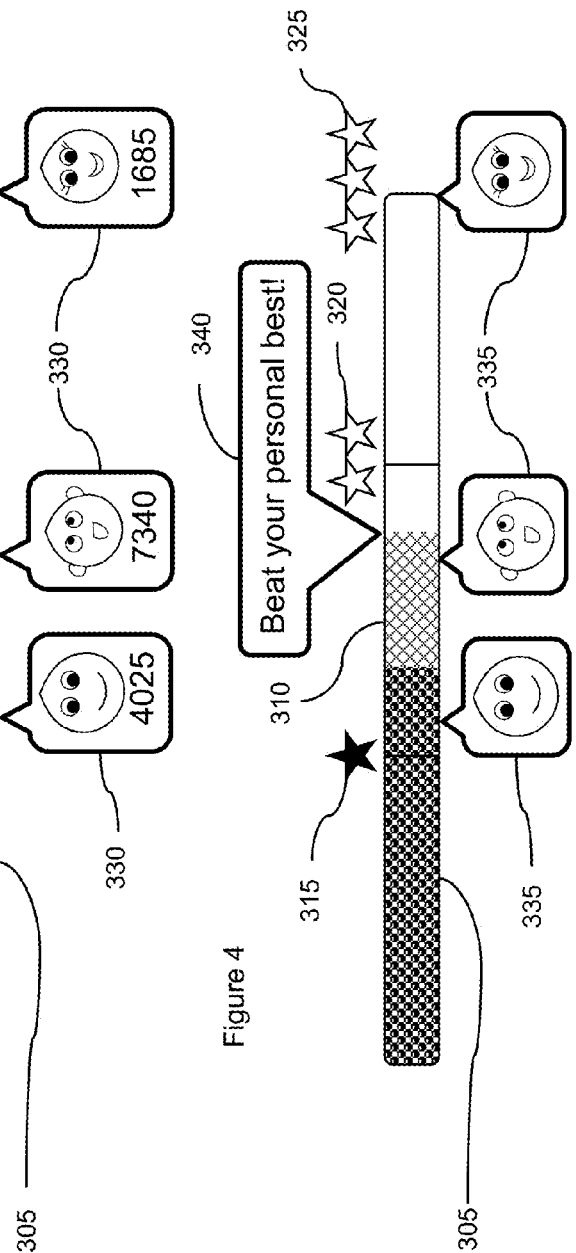

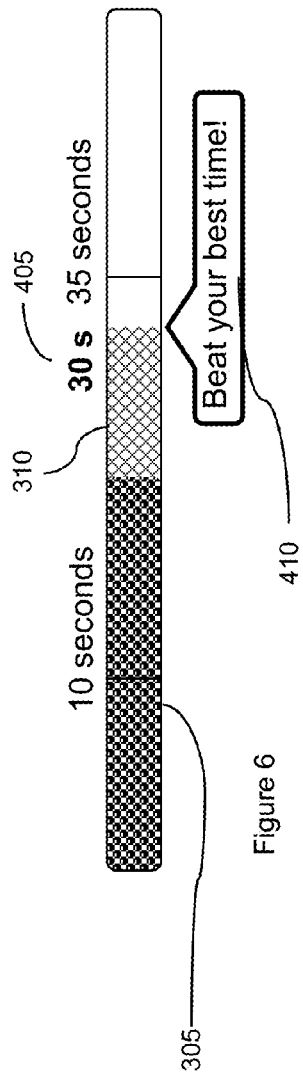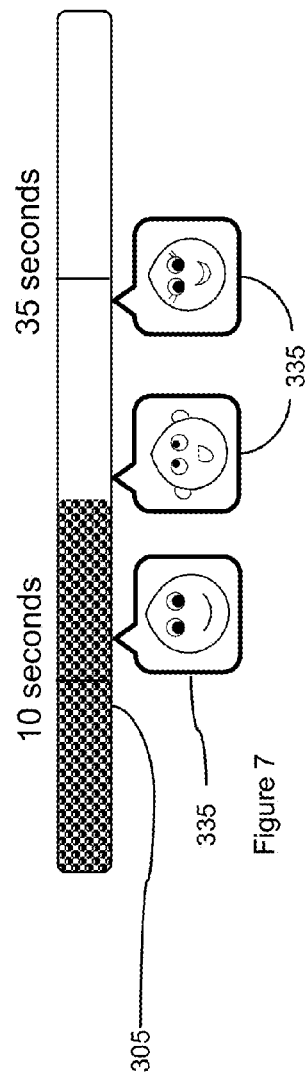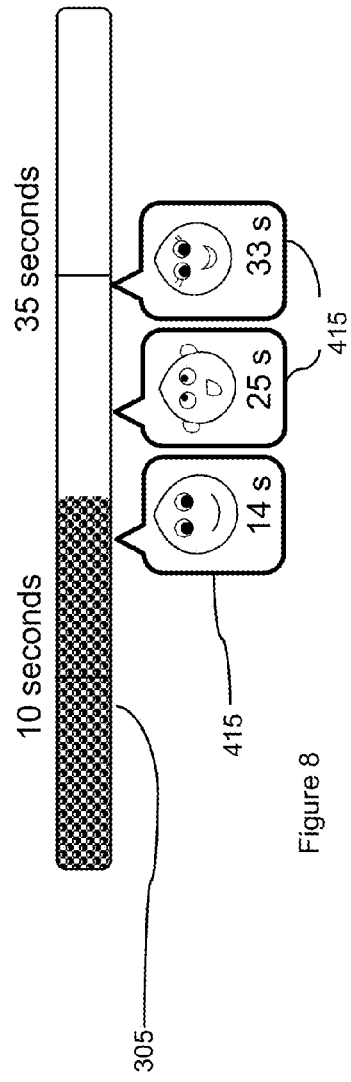
Figure 6
Figure 7
Figure 8

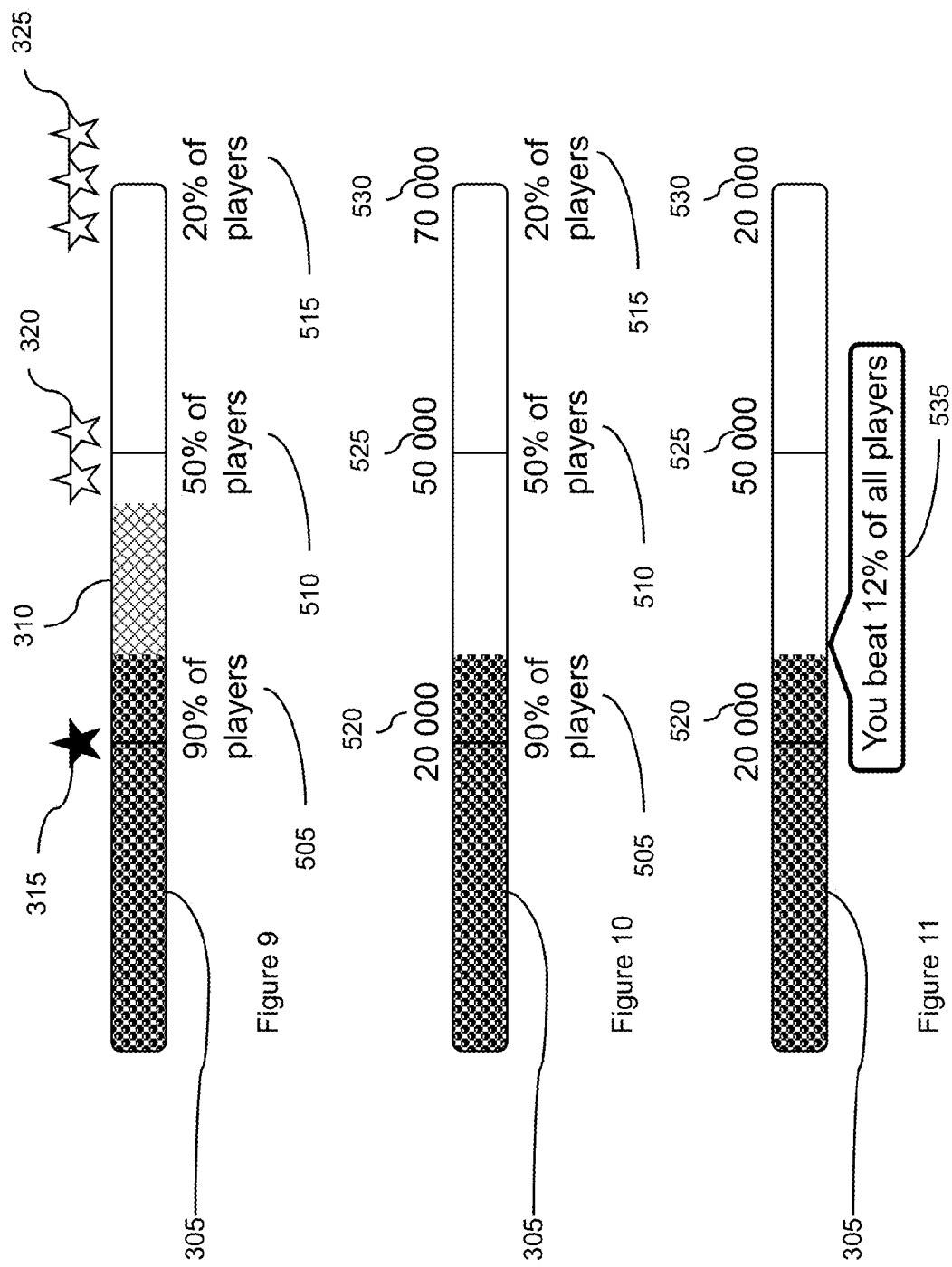

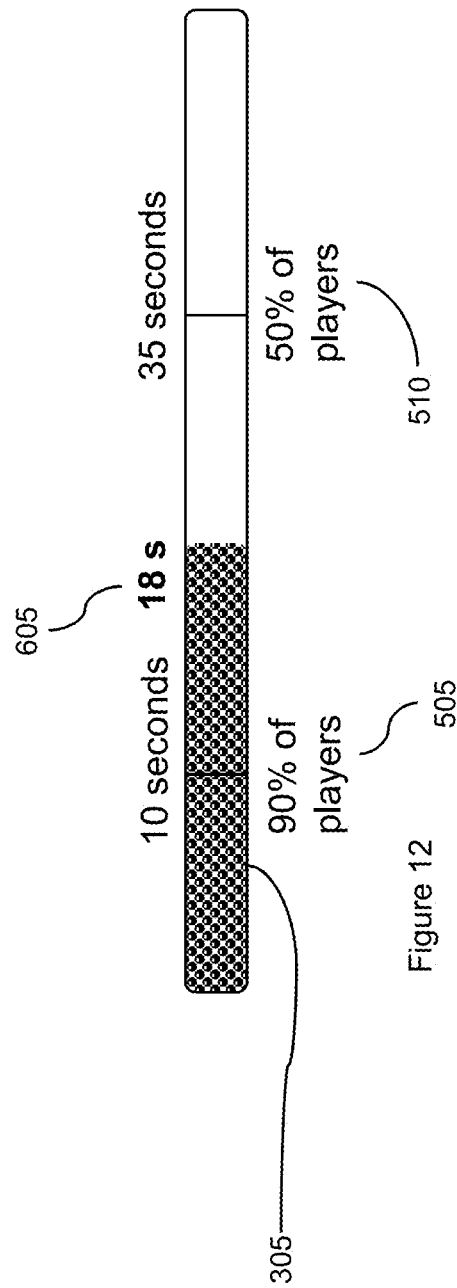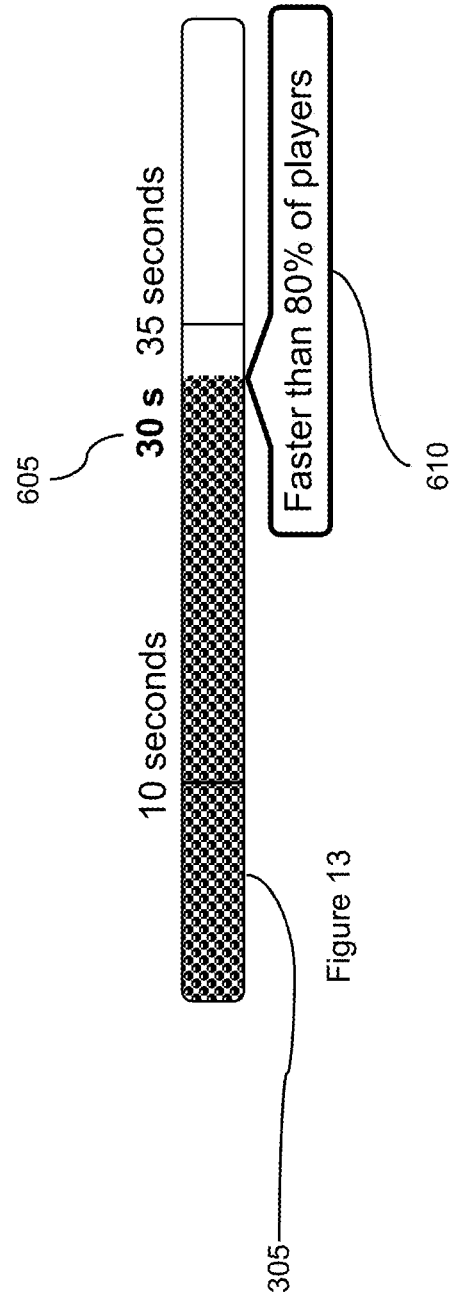
Figure 12
Figure 13

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

1. Field of the Invention

The present invention pertains to the field of score meters in a virtual game, combined with user-information from a social network.

2. Technical Background

The invention is intended for use on a device such as a computer or a smartphone. Those skilled in this art will understand that this it is not limited to these devices, but can function on any device capable of incorporating games where this feature could be used.

A social network game is a type of online game played through social networks, typically featuring multiplayer and asynchronous gameplay mechanics. Social network games are most often implemented as browser games, but can also be implemented on other platforms such as mobile devices. They are amongst the most popular games played in the world, with several such products having tens of millions of players.

While they share many aspects of traditional video games, social network games often employ additional ones that make them distinct. Historically, they are largely intended to be casual games.

Early social networking on the World Wide Web began in the form of general online communities. Many of these early communities focused on bringing people together to interact with each other through chat rooms, encouraging users to share personal information and ideas on personal webpages, created with easy-to-use publishing tools and free or inexpensive webspace. Some communities took a different approach by simply having users link to each other via email addresses. In the late 1990s, user profiles became a central feature of social networking sites, allowing users to compile lists of "friends" and search for other users with similar interests.

New social networking methods were developed by the end of the 1990s, and many sites began to develop more advanced features for users to find and manage friends. This newer generation of social networking sites began to flourish with the emergence of SixDegrees.com in 1997, followed by Makeoutclub in 2000, Hub Culture and Friendster in 2002, and soon became part of the Internet mainstream. Friendster was followed by MySpace and LinkedIn a year later. Facebook, launched in 2004, became the largest social networking site in the world in early 2009.

DISCUSSION OF RELATED ART

The concept of a high score first achieved cultural significance with the rise in popularity of pinball machines and electro-mechanical arcade games. Players who achieve a high score are often able to enter their initials or name into the machine. Their score and name will remain there until someone "knocks" them off the high score list by achieving a higher score. For this reason, high scores are inherently competitive and may sometimes involve one-upmanship against other players.

The first video game to use the term "high score" was probably Midway's Sea Wolf (1976). In these early video games, the player would attempt to reach a pre-determined high score within an allotted time period, after which they would win bonus playing time, since it was not possible to save the top score.

The high score concept changed in 1978 with the release of Taito's shoot'em up Space Invaders. High scores were determined as gamers played for as long as they could stay alive, while the high scores kept rising. This was made possible by saving the player's score; and this is the first known game to have done this.

In recent adaptations, a player's score is often represented by some kind of gauge during gameplay.

The use of high score as a tool for comparing the player's score with those of friends or other players is well suited for games played on social networks. However, the high scores of others are not always readily available, and the player might have to wait until after the game is finished to see such scores. This arguably makes for a less competitive environment, since the player is not informed of his relative performance until after the game is finished, as opposed to knowing what score to beat while still playing.

The present invention solves this problem by providing users with an easily accessible way of comparing one's score to that of either friends or other players, while actually playing the game. It provides different ways of presenting the scores of other, and in some implementations the player can choose himself with which players to compare his score.

SUMMARY OF THE INVENTION

A first aspect is:

A method, implemented as computer code being executed by one or more processors, in which a computing device displays computer game graphics showing a score for a computer game, and in which, one or more of the processors are programmed to:
  (a) receive the score a player achieves while playing a game; and
  (b) visually indicate how this score relates to one or multiple pre-defined goals;
  (c) receive information about the high scores of different players of the game (d) compare the current score of the player, the previous high score of the player and the high scores of the different players; and (e) during the play of the game, visually represent the difference between the current score, the high scores of the different players and the pre-defined goal(s).

Any one or more of the following optional features may be included, resulting in a method:

in which a processor is programmed to receive the high scores of the different players, when gathered from a social network of the user.

in which a processor is programmed so that the pre-defined goals are visually represented by a plurality of stars, more stars indicating a better score.

in which a processor is programmed so that the visual representation of the score of the different players are accompanied by the scored points of those players.

in which a processor is programmed so that the representations of the score of the different players are pictures associated with those players.

in which a processor is programmed so that the representations of the score of the different players are the names of those players.

in which a processor is programmed so that the comparison of scores is done on a relative scale.

in which a processor is programmed so that the comparison of scores is done on an absolute scale.

in which a processor is programmed so that the unit used for comparison is in percentages.

in which a processor is programmed so that the time for completing a level is displayed.

in which a processor is programmed so that the time for completing a level is compared with the time for the different players completing that level.

in which a processor is programmed so that the score of the player is compared to the high score of the different players playing the game.

in which a processor is programmed so that the player's time for completing a level is compared to all other player's time for completing that level.

in which a processor is programmed so that the comparison of times for completing a level is done on a relative scale.

in which a processor is programmed so that the comparison of times for completing a level is done on an absolute scale.

in which a processor is programmed so that multiple players can compare their scores with each other in which the game is played on a handheld device.

in which the game gives an audible output when the player's current score exceeds a previous score of another player.

in which player is presented with a message about how close he is to pass the performance measure of another player when the player's performance measure is within a threshold of the other player's.

in which a processor is programmed to visually represent the difference between the current score, the high scores of the different players and the pre-defined goal by showing a linear bar divided into sections, the long axis corresponding to an increasing score and the boundary between each section corresponding to a different performance level, such as a 1 star, 2 star and 3 star level, and in which the current score is shown as a coloured region of the bar and the different high scores are indicated on the bar.

in which the players are all connected to one another via a social network in which the different players are friends of the player on the social network in which the high scores of at least some of the other players are indicated on the bar using a small thumbnail image used by that player on their social network page.

in which the game is a casual, social game, namely a game that can be downloaded as an app to a smartphone and/or tablet computer and which can be accessed or played using a social network application or environment A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device; and in which, one or more of the processors are programmed to:

(a) receive the score a player achieves while playing a game; and (b) visually indicate how this score relates to one or multiple pre-defined goals;

(c) receive information about the high scores of different players of the game (d) compare the current score of the player, the previous high score of the player and the high scores of the different players; and (e) during the play of the game, visually represent the difference between the current score, the high scores of the different players and the pre-defined goal(s).

A third aspect is:

A non-transitory computer readable medium encoded with instructions for controlling a computer system to display a game on a display, in which the instructions enable a processor to:

(a) receive the score a player achieves while playing a game; and (b) visually indicate how this score relates to one or multiple pre-defined goals;

(c) receive information about the high scores of different players of the game (d) compare the current score of the player, the previous high score of the player and the high scores of the different players; and (e) during the play of the game, visually represent the difference between the current score, the high scores of the different players and the pre-defined goal(s).

BRIEF DESCRIPTION OF THE DRAWINGS

FIG. 2 shows the interaction between a server, a network and a client device.

FIG. 3 shows a game in progress without indications of other players' scores

FIG. 4 shows a game in progress with indications of other players' scores.

FIG. 5 shows a game in progress with indications of other players' scores.

FIG. 6 shows a game in progress without indications of other players' scores.

FIG. 7 shows a game in progress with indications of other players' scores.

FIG. 8 shows a game in progress with indications of other players' scores.

FIG. 9 shows a game in progress with indications of other players' average scores.

FIG. 10 shows a game in progress with indications of other players' average scores.

FIG. 11 shows a finished game with indications of other players' scores.

FIG. 12 shows a game in progress with indication of other players' scores.

FIG. 13 shows a finished game with an indication of average scores.

DETAILED DESCRIPTION

In the following description of various implementations of the invention, reference is made to the accompanying drawings which form a part thereof, and in which are shown by illustration various implementations in which the invention may be utilized. It is to be understood that other implementations may be utilized, and structural and functional modifications may be made without departing from the scope of the present invention.

Figure 1:
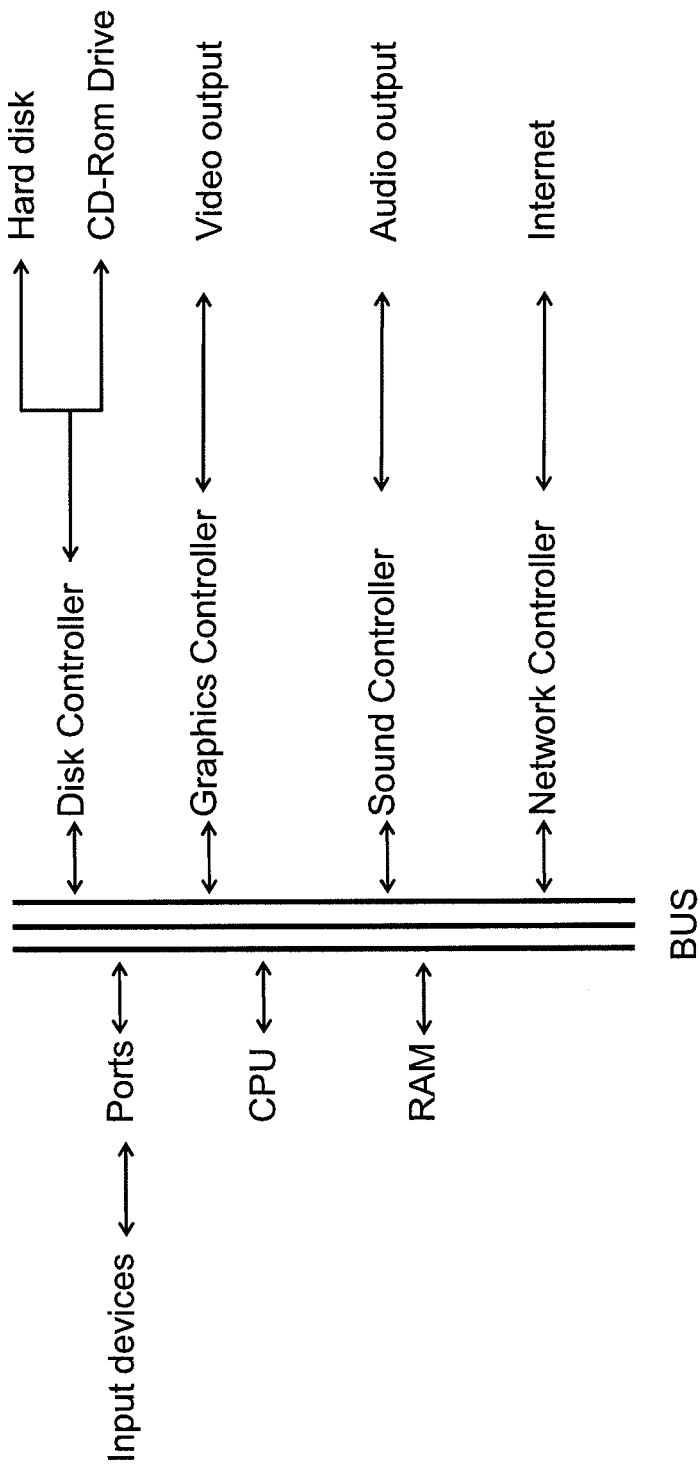
FIG. 1 shows a schematic picture of a computer.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through either wireless or wired connection.

FIG. 2 portrays an exemplary overall environment in which the present invention can be utilized. A virtual game is stored on, for instance, a game server 210. The virtual game is to be played on a client device, such as a computer 240, 250 or a smartphone 260. The client device communicates with the game server 210 and a social network 230, for instance through the Internet 220. It should be understood that the social network 230 and the game server 210 does not have to be located in different places, they could be on the same server. An environment where the invention may be implemented is described in PCT/EP2013/060641 which is hereby incorporated by reference. People skilled in the art will understand that devices other than the exemplary ones listed can also be used, without departing from the spirit and scope of the invention.

FIG. 3 shows one implementation of the invention, when there is no available reference data from other players. The first part of the meter 305 reflects the current score of a game in progress. Signs such as stars, 315, 320, 325 can be used to indicate when a certain level of score has been reached. In one implementation, there are three levels of scores that are represented by one, two and three stars respectively. When a player passes a certain score level during the play of a game, that can be visually represented by the indicator of that score level being lit up such as star 315 is in the figure. The second part of the score meter 310 shows the best previous result of the player in a particular level of the game. This can be accompanied by, for instance, an encouraging message 340.

FIG. 4 shows an implementation of the invention where there is reference data from other players available. The present invention has ways of displaying indications of other players' previous scores, score indications, for instance through the use of pictures 330 associated with those players. These pictures can be accompanied by additional information, such as the absolute score that those players scored. It should be understood that other data can also be shown in relation to the score indications of other players, such as how long ago that score was achieved or how many tries it took to achieve it. FIG. 5 shows a similar implementation to the one depicted in FIG. 4, but here there is no additional information accompanying the pictures associated with other players.

It should be understood that the invention is not limited to using stored scores to show the performance of other players. In one implementation, players can see the scores of other players currently playing the same level while they are playing it, making it so that the indications of other players' scores can be moving in real time during the play of a game.

FIG. 6 shows another implementation of the present invention where time is measured instead of score, and where no information related to other players is used to compare with. People skilled in the art will recognise that measurement of time and score are not mutually exclusive, in other implementations both could be shown at the same time. Other variables than time and score can also be measured, such as the amount of times a player has played a level.

As in the implementation showing sore, the meter can have one portion 305 indicating the current time and another portion indicating the player's previously best time 310. This can also be represented by an absolute value 405. An encouraging message 410 can be shown in relation to for instance the player's previously best result.

FIG. 7 and FIG. 8 show two implementations of the invention where time is a measured variable and in which reference data from other players is available. The two shown implementations have score indications of other players 415, but unlike FIG. 4 and FIG. 5, the score indications is related to time instead of points.

FIG. 9 shows another exemplary implementation of the invention. In this implementation, the player can compare himself with the average scores of players having played the same level previously. These average scores can for instance be shown in percentages 505, 510, 515. In some implementations, the player can choose to compare himself to for instance the average score of all players having played the level, friends from a social network, or to a select list of friends from a social network.

The representation of different score levels can be done in other ways than stars. For instance, the numeral value of a score 520, 525, 530 can be used to represent the different levels of scores, as shown in FIG. 10.

In one implementation, a result will be displayed to the player upon finishing a level. FIG. 11 depicts one type of message 535 indicating how the player performed compared to other players who have previously played the level. In other implementations, the type of indication can be something other than the relative performance, such as the absolute score or the number of stars achieved. The basis for comparison can also differ, for instance it can be the result of a certain player, the average results of all players previously having played the level, or the average result of all friends from a social network.

FIG. 12 and FIG. 13 show two other implementations where the players score is compared with the average scores of other players, but in these implementations time is used rather than points. The current time of a player 605, or score or other variables in other implementations, can be displayed during the play of a game. FIG. 13 shows another implementation of a message indicating the performance of a player 610.

Figure 14:
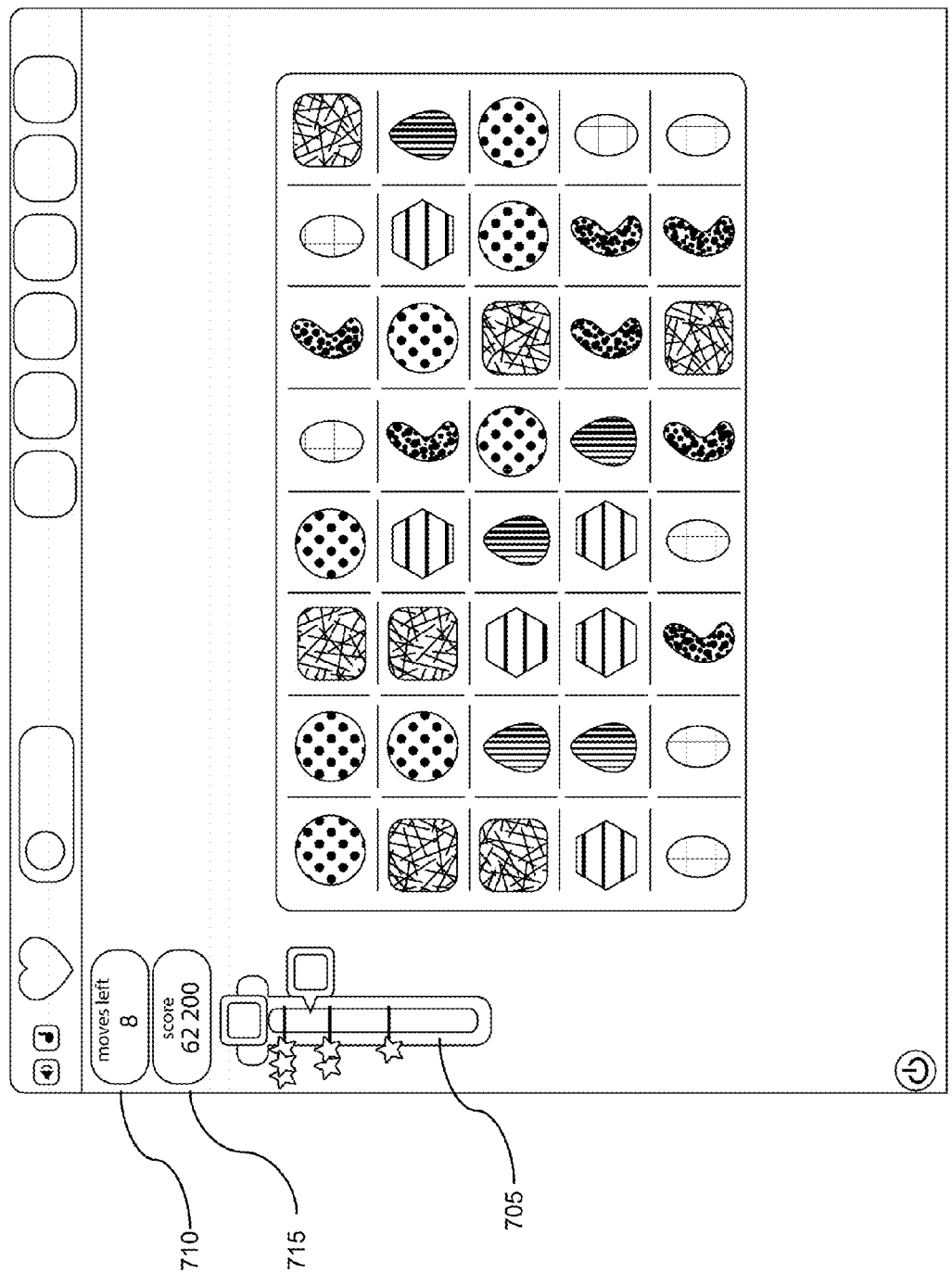
FIG. 14 shows one implementation of a game incorporating the invention.
Figure 15:
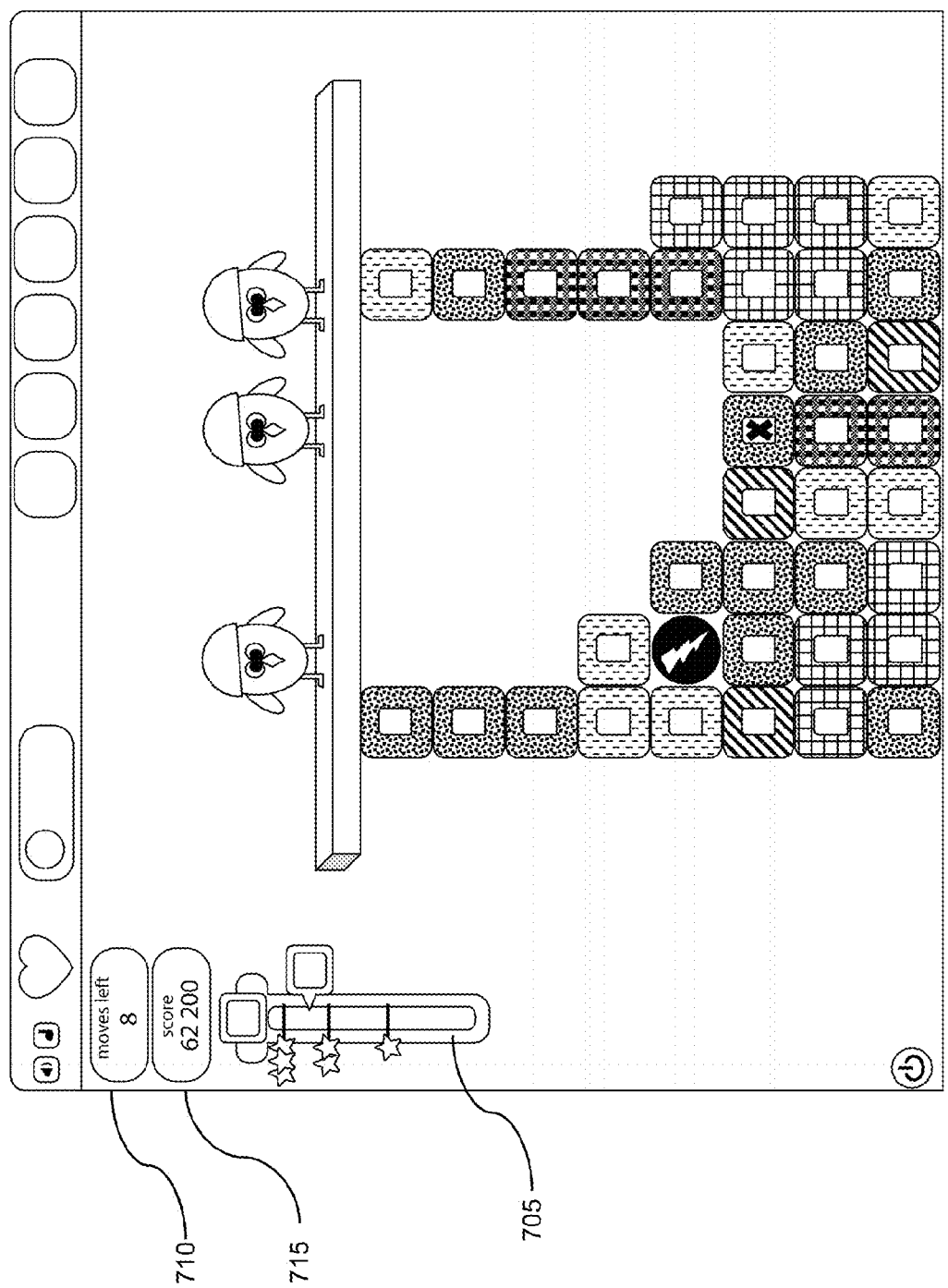
FIG. 15 shows one implementation of a game incorporating the invention.

FIG. 14 shows a typical implementation where the invention is used in a 'Match 3'-game. The score meter 705 is vertical, as opposed to horizontal in the previous figures. However, it should be understood that it can be implemented in any number of other ways as well, such as slightly tilted or diagonally. Indicators are showing the number of moves left 710 and the current score of a player 715 can be displayed together with the score meter. FIG. 15 shows another typical implementation of the invention in a game environment.

Figure 16:
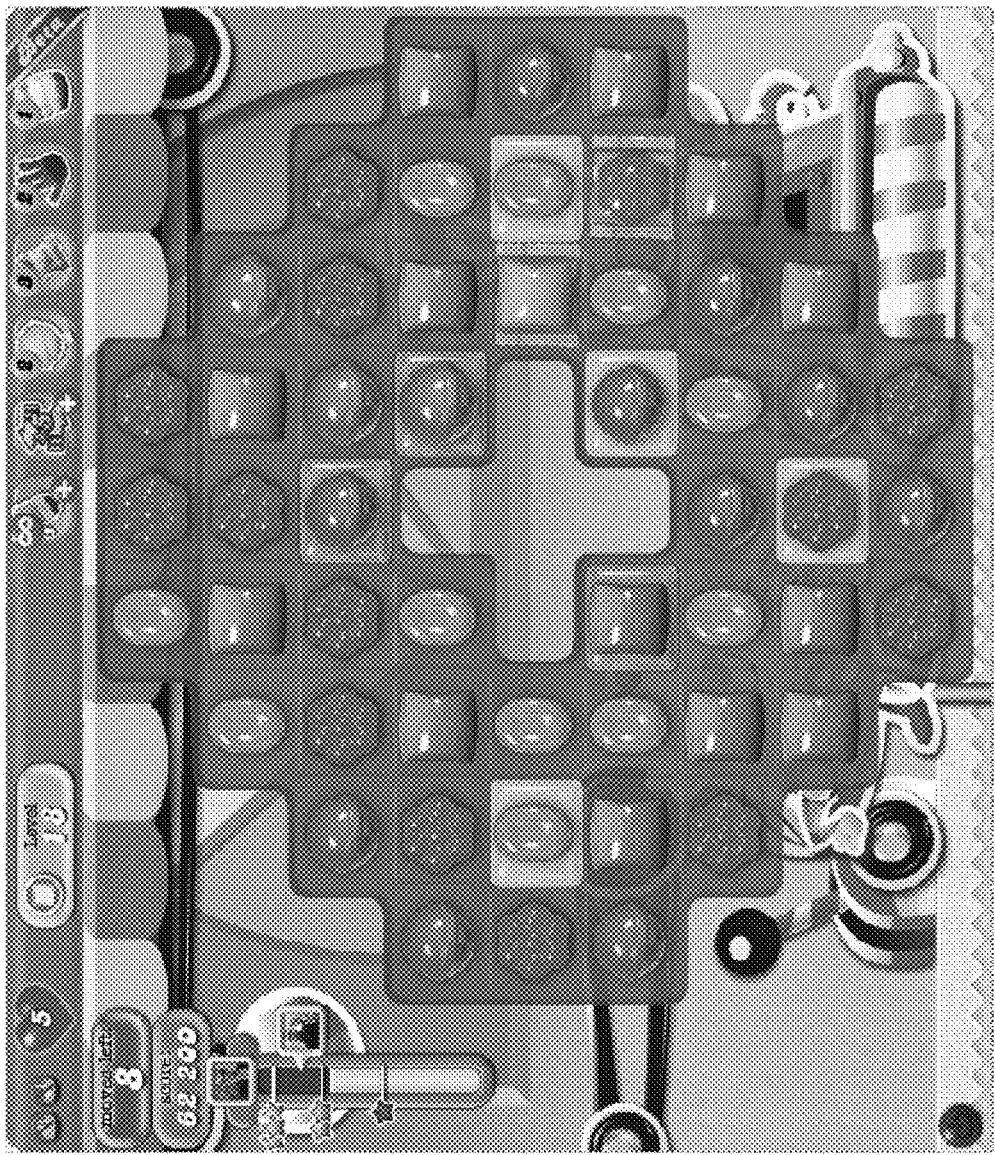
FIG. 16 shows an in-game screenshot of a game incorporating the invention.
Figure 19:
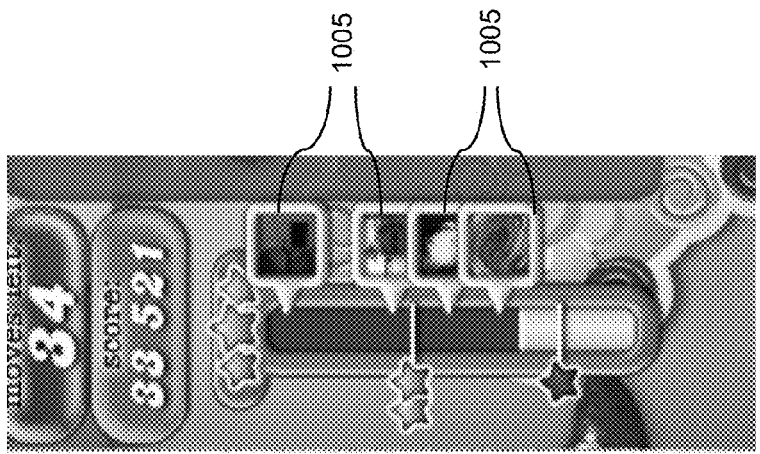
FIG. 19 shows a magnified in-game picture of the star meter within one implementation of a game incorporating the invention.
Figure 18:
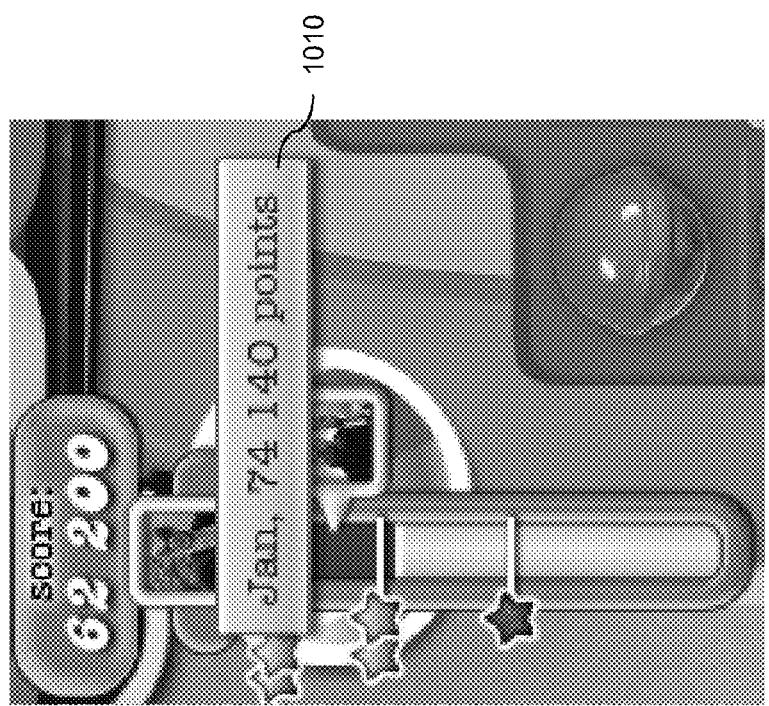
FIG. 18 shows a magnified in-game picture of the star meter within one implementation of a game incorporating the invention.
Figure 17:
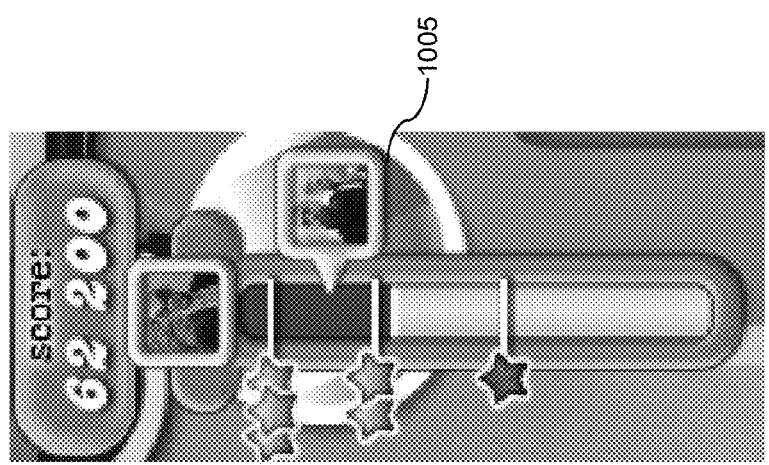
FIG. 17 shows a magnified in-game picture of the star meter within one implementation of a game incorporating the invention.

FIG. 16 shows an exemplary 'Match 3'-game in which the invention is implemented. FIG. 17 is a magnified picture of the score meter from the in-game screenshot with a score indication of another player 1005. FIG. 18 shows one implementation in which the score and the name of a player 1010 is shown by hovering over the score indication related to that player. There can be other information shown, for instance a nickname instead of a real name and the number of moves that player used to complete the level instead of the score. It should also be understood that hovering over the indication is only one way of implementing the invention. Other mechanisms to trigger the display of information can for instance be after a set period of time or when the player has used a certain amount of moves. FIG. 19 shows a similar implementation to FIG. 18, but where reference data from more players is available and subsequently more score indications 1005 for other players are shown.

The invention claimed is:

1. A computer implemented method for displaying, on a display, computer game graphics comprising scores for a computer game, comprising executing on one or more processors the steps of:
   determining a current score of a player of the device;
   receiving from a server, information about high scores of different players of the game; and
   during the play of the game, displaying on the display a meter having a total extent, said meter comprising visual representations of: the current score with respect to a high score of the player of the device, the high scores of the different players of the game, and a pre-defined goal,
   wherein said high score of the player of the device, the high score of the different players of the game, and said predefined goal are represented along said total extent,
   wherein the current score is represented by a first extent of said total extent of said meter, said first extent being changed as the current score changes during said computer game.

2. The method of claim 1, wherein the step of receiving from a server, information about high scores of different players of the game comprises receiving said information for players of a social network of the user.

3. The method of claim 1, wherein the visual representation of the pre-defined goal comprises a plurality of stars.

4. The method of claim 1, wherein the visual representations of the high scores of the different players comprise the scored points of those players.

5. The method of claim 1, wherein the visual representations of the high scores of the different players comprise pictures associated with those players.

6. The method of claim 1, wherein the visual representations of the high scores of the different players comprise the names of those players.

7. The method of claim 1, further comprising comparing the current score of the player, the high score of the player, and the high scores of the different players.

8. The method of claim 7, wherein the comparison of scores is done on an absolute scale.

9. The method of claim 7, wherein the unit used for the comparison is in percentages.

10. The method of claim 1, further comprising displaying on said display the time for completing a level.

11. The method of claim 1, further comprising comparing a score of the player to the high scores of the different players of the game.

12. The method of claim 1, further comprising comparing the player's time for completing a level to the different players' time for completing said level.

13. The method of claim 12, wherein the comparing of times for completing a level is done on a relative scale.

14. The method of claim 12, wherein the comparing of times for completing a level is done on an absolute scale.

15. The method of claim 1, further comprising comparing scores of multiple players.

16. The method of claim 1, wherein said computing device is a handheld device.

17. The method of claim 1, further comprising producing an audible output when the current score of the player exceeds a previous score of another player.

18. The method of claim 1, further comprising displaying on said display a message when a performance measure of the player of the device is within a threshold of a performance measure of another player of the game.

19. The method of claim 1, further comprising visually representing the difference between the current score, the different high scores and the pre-defined goal by showing a linear bar divided into sections,
   wherein the long axis of the linear bar corresponds to an increasing score and the boundary between each section corresponding to a different performance level
   wherein the current score is shown as a coloured region of the bar and the high scores of the different players of the game are indicated on the bar.

20. The method of claim 19, further comprising indicating on the bar, the high scores of at least some of the player of the device's friends,
   wherein said indication comprises a thumbnail image used by said friend on their social network page.

21. The method of claim 1, wherein the player of the device and the different players of the game are connected to one another via a social network.

22. The method of claim 1, wherein the different players are friends of the player of the device on a social network.

23. The method of claim 1, further comprising downloading the game as an app,
   wherein the game is a casual, social game that can be accessed or played using a social network application or environment,
   wherein the computing device is either: a smartphone or a tablet computer.

24. The method of claim 7, wherein the comparison of scores is done on a relative scale.

25. A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device; and in which, one or more of the processors execute steps to:
- determine a current score of a player of the device;
- receive, from a server, information about high scores of different players of the game; and
- during the play of the game, display on the display a meter having a total extent, said meter comprising visual representations of: the current score with respect to a high score of the player of the device, the high scores of the different players of the game, and a pre-defined goal,
- wherein said high score of the player of the device, the high score of the different players of the game, and said predefined goal are represented along said total extent,
- wherein the current score is represented by a first extent of said total extent of said meter, said first extent being changed as the current score changes during said computer game.

26. A non-transitory computer readable medium encoded with instructions for controlling a computer system to enable display of a game on a display, in which the instructions when executed on a processor enable the processor to:
- determine a current score of a player of the device;
- receive, from a server, information about the high scores of different players of the game; and
- during the play of the game, display on the display a meter having a total extent, said meter comprising visual representations of: the current score with respect to a high score of the player of the device, the high scores of the different players of the game, and a pre-defined goal,
- wherein said high score of the player of the device, the high score of the different players of the game, and said predefined goal are represented along said total extent, wherein the current score is represented by a first extent of said total extent of said meter, said first extent being changed as the current score changes during said computer game.

27. A computer implemented method for displaying, on a display, computer game graphics comprising scores for a computer game, comprising executing on one or more processors the steps of:
- determining a current score of a player of the device;
- receiving from a server, during play of the game, the current scores of other players of the game;
- receiving from a server, information about high scores of different players of the game, wherein said different players are social network contacts of said player of the device;
- during the play of the game, displaying on the display a meter having a total extent, said meter comprising visual representations of: the current score with respect to a high score of the player of the device, the current scores of other players of the game, the high scores of the different players of the game, and a pre-defined goal, said meter comprising a linear bar divided into sections, a long axis of the linear bar corresponding to an increasing score, and the boundary between each section corresponding to a different performance level, wherein the visual representation of said predefined goal comprises at least one star;
- wherein said high score of the player of the device, the high score of the different players of the game, and said predefined goal are represented along said total extent, wherein the current score is represented by a first extent of said total extent of said meter, said first extent being changed as the current score changes during said computer game; wherein the high score of the player of the device is represented by a second extent of said total extent of said meter.

* * * * *